United States Patent
Takayama

(10) Patent No.: US 6,573,933 B1
(45) Date of Patent: Jun. 3, 2003

(54) IMAGE PROCESSING APPARATUS, IMAGE PROCESSING METHOD, AND A COMPUTER-READABLE RECORDING MEDIUM WITH A PROGRAM MAKING A COMPUTER EXECUTE THE METHOD STORED THEREIN

(75) Inventor: Akinoli Takayama, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/165,152

(22) Filed: Oct. 2, 1998

(30) Foreign Application Priority Data

Jun. 15, 1998 (JP) ............................. 10-166935

(51) Int. Cl.[7] .......................... H04N 9/73; H04N 5/235; H04N 5/217
(52) U.S. Cl. ................. 348/226.1; 348/241; 348/229.1; 348/230.1
(58) Field of Search ................................ 348/226, 229, 348/230, 241, 370, 226.1, 229.1, 230.1

(56) References Cited

U.S. PATENT DOCUMENTS

| | | | | |
|---|---|---|---|---|
| 5,293,238 A | * | 3/1994 | Nakano et al. ............. | 348/226 |
| 5,379,063 A | * | 1/1995 | Kishi et al. ................. | 348/208 |
| 5,384,595 A | * | 1/1995 | Sakaguchi ................... | 348/226 |
| 5,430,483 A | * | 7/1995 | Haruki ....................... | 348/226 |
| 5,452,004 A | * | 9/1995 | Roberts ...................... | 348/301 |
| 5,559,555 A | * | 9/1996 | Shimizu et al. ............. | 348/364 |
| 5,877,810 A | * | 3/1999 | Inuiya et al. ............... | 348/229 |
| 6,084,632 A | * | 7/2000 | Inuiya et al. ............... | 348/229 |

FOREIGN PATENT DOCUMENTS

JP  5-115024  5/1993

* cited by examiner

Primary Examiner—Wendy R. Garber
Assistant Examiner—Lin Ye
(74) Attorney, Agent, or Firm—Staas & Halsey LLP

(57) ABSTRACT

Each brightness value for an image data string for each of a plurality of fields successively stored in a RAM, is integrated by an integrator, and a result of the integration is stored in registers. Image data for a current field stored above is stored in a register, and further a one-field pixel average value for the image data is computed. The computed one-field pixel average value is stored in the register. Image data for each field stored in registers, is integrated by an integrator, and further a three-field pixel average value is computed from the result with the computed average value stored in a register. Computing is executed in a computing section by using the one-field pixel average value, three-field pixel average value, and an Image data string stored in the RAM to generate corrected image data.

24 Claims, 9 Drawing Sheets

IMAGE PROCESSING APPARATUS, IMAGE PROCESSING METHOD, AND A COMPUTER-READABLE RECORDING MEDIUM WITH A PROGRAM MAKING A COMPUTER EXECUTE THE METHOD STORED THEREIN

FIELD OF THE INVENTION

The present invention relates to an image processing apparatus as well as to an image processing method for processing image signals transmitted from an image pick-up tube or an image pick-up element, and more specifically to an image processing apparatus and an image processing method for suppressing flickers of a fluorescent lamp as well as to a computer-readable recording medium with a program for making a computer execute the method stored therein.

BACKGROUND OF THE INVENTION

Generally a television camera (an image pick-up device) for picking up image of an object converts pixel information to an image signals for enabling reproduction of an image on a television receiver. In this step, the pixel information is expressed with brightness values for pixels two-dimensionally distributed, and the television camera (an image pick-up device) converts the pixel information to one-dimensional image signals based on a prespecified transmission system.

In a television system, generally luster scanning is employed as processing for conversion to one-dimensional image signals, namely as scanning, and basically image information for an entire screen is fetched by means of horizontal scanning for fetching a brightness value or color information at each pixel position on a screen and vertical scanning for repeatedly executing the horizontal scanning from a top to a bottom of a screen. Especially skip scanning is executed in which the horizontal scanning is executed for every n−1 scanning lines and the vertical scanning is executed n times for the entire screen. To form a screen, namely one frame in the skip scanning, n times of vertical scanning, namely n fields are required.

As a transmission system for a color television currently being used, there are the three systems of NTSC system, PAL system, and SECAM system, but herein consideration is made for a case,where the NTSC system is employed.

In the NTSC system, the number of scanning lines is 525 lines, and one frame comprises two fields, one consisting of an odd number field and another consisting of an even number field. Also in the NTSC system, a frame frequency is 30 Hz, namely scanning is executed at a rate of 60 fields per second.

When picking up image of an object using an analog type of image pick-up tube as a television camera based on this NTSC system and a fluorescent lamp using a 50 Hz power as illumination, image signals each including twinkling with a constant cycle, namely flickers are generated. FIG. 7 is an explanatory view for illustrating field scanning in a television camera using a 50 Hz power fluorescent lamp and executing scanning at a rate of 60 fields per second and flickers generated under the conditions.

As shown in FIG. 7, in ordinary fluorescent lamps generally used outdoors, flickers with a frequency of 100 Hz, namely discharge of a 1/100 second cycle is repeated with a 50 Hz AD voltage. In contrast, in a television camera executing scanning at a rate of 60 fields per second, 1/60 second is required for scanning one field. For this reason, both a time required for executing discharge 5 times in a fluorescent lamp and a time required for 3 times of field scanning in a television camera executing scanning a rate of 60 fields per second are 1/20 sec, and under this time interval, discharge timing in the fluorescent matches timing for scanning pixel positions within one field of the television camera.

Immediately after a discharge voltage is loaded to a fluorescent lamp, the brightness becomes relatively high, so that also a reflected light from an object at the point of time and on has relatively large magnitude, and a large signal can be obtained at a pixel position with a reflected light having large magnitude therefrom detected at the point of time. When this signal is transmitted as an image signal to a television receiver for reproduction of the image, twinkling with a frequency of 20 Hz, namely flickers is felt.

For instance, in FIG. 7, under the discharge timings No. 1, No. 6, and No.11 in a fluorescent lamp as well as the scanning times for fields No. 1, No. 4, and No. 7 in a television camera, flickers No. a1, No. a2, and No. a3 corresponding thereto respectively are generated. Also for other discharge numbers in the fluorescent lamp and other fields each having a different field number in a television camera, flickers for 3 fields numbered as b1, b2 and b3; c1, c2 and c3; d1, d2 and d3; or e1, e2 and e3 as one cycle respectively is generated.

Also in a case where a digital type of solid image pick-up device such as a CCD (Charge Coupled Device) is used as a television camera, as a shuttering speed of a shutter for making pixels arrayed two-dimensionally receive a reflected light from an object is equivalent to a field scanning frequency in an analog type of image pick-up tube, if the shuttering speed is 60 Hz or 60 times per second, the flickers described above is generated.

So there has been proposed an image pick-up device capable of suppressing flickers in a fluorescent lamp for suppressing the flickers as described above. FIG. 8 is a block diagram showing general configuration of an image pick-up device capable of suppressing flickers in a fluorescent lamp based on the conventional technology.

In. FIG. 8, a brightness signal outputted from an image pick-up element 101 is inputted into a gain control unit 102, and a level of the inputted brightness signal is adjusted therein. The brightness signal is transmitted via the gain control unit 102 to an A/D converter 103 to convert the signal to a digital signal, and the converted signal is subjected to appropriate signal processing in a digital image signal processing unit 104. The digital brightness signal having been subjected to digitalizing processing in the image signal processing unit 104 is transmitted to the D/A converter 105 and is converted to an analog signal therein, and is displayed as an image in an output device 106.

The digital brightness signal having been subjected to the digitalizing processing in the image signal processing unit 104 is also transmitted to an integrator 107. In the integrator 107, an integrated value digital data signal for one field is generated by adding thereto each of the digital brightness signals sequentially transmitted as described above. The generated integrated value digital data signal is transmitted to a gain computing unit 108. In the gain computing unit 108, a gain is computed by dividing a reference value by an integrated value indicated by the integrated value digital data signal.

Herein the integrated value digital data signal is a signal including an excessive brightness signal generated due to flickers, and by computing a gain with the gain computing unit 108, correction of an integrated value digital data signal not including a reference value, namely flickers becomes possible. The computed gain is transmitted as a gain signal to a one-field delay unit 109, and is inputted into the gain control unit 102 after passage of one field scanning time. In the gain control unit 102, a level of a brightness signal inputted from the image pick-up element 101 according to a gain signal, and then the processing described above is repeated.

A timing chart for the processing above is shown in FIG. 9. In FIG. 9, each of the brightness signals from start to end of scanning for the n-th field is added in the integrator 107 for obtaining an integrated value for the n-th field. Then each of brightness signals from start to end of scanning for the n+1-th field is also added in the integrator 107 to obtain an integrated value for the n+1-th field. In this step, the integrated value for the n+1-th field is inputted into the gain computing unit 108 at the same timing to obtain a gain for the n-th field.

Further, each of brightness signals from start to end of scanning for the n+2-th field is added in the integrator 107 to obtain an integrated value for the n+2-th field. At the same timing, transmission of a gain for the n-th field to the next block is held, namely delayed by one-field scanning time, and at the same time an integrated value for the n+1-th field is inputted into the gain computing unit 108 to obtain a gain for the n+1-th field.

Further each of brightness signals from start to end of scanning for the n+3-th field is added in the integrator 107 to obtain an integrated value for the n+2-th field. In this step, at the same timing, a gain for the n-th field to the next block is held, namely delayed by one-field scanning time, and at the same time an integrated value for the n+1-th field is inputted into the gain computing unit 108 to obtain a gain for the n+1-th field.

The processing at the timing above is, in FIG. 8, achieved by receiving a synch. signal generated by a synch. signal generator 110 with the integrator 107, gain computing unit 108, and one-field delay unit 109. For this reason, gain control with flickers having been corrected, is executed to a brightness signal outputted from the gain control unit 102 always according to a brightness signal for a field ahead by three fields from a current one, and image display is executed according to signals having been subjected to gain control.

Also in the digital type of solid image pick-up device based on the conventional technology, to suppress the flickers in a fluorescent lamp as described above, there is a method of suppressing a time for fetching a reflected light from an object, namely a time for receiving light at one pixel to 1/100 sec. In this case, for the time of 1/100 sec which is equivalent to a discharge interval in a fluorescent lamp twinkling at a frequency of 100 Hz, each pixel in a CCD can obtain a signal indicating a quantity of light including flickers, and an excessive signal including flicker becomes not so remarkable.

Further in the digital type of solid image pick-up device based on the conventional technology, it is possible to suppress generation of periodical flickers by providing a mechanical iris capable of changing a time for receiving light once for a pixel.

However, the image pick-up device capable of suppressing flickers in a fluorescent lamp used in an analog type of image pick-up tube based on the conventional technology is an image pick-up device capable of suppressing fluorescent lamp flickers to an analog type of image pick-up image equipped with an A/D converter and a D/A converter, and configuration of the device is relatively large, and can not be used for a compact and digital type of a solid image pick-up device using a CCD or the like.

A compact type of CCD camera is often used as a television camera used in a television conference system or in a television telephone system, and an image pick-up device capable of suppressing flickers in a fluorescent lamp in the analog type of image pick-up tube based on the conventional technology can not be used for the purposes as described above. In a case of a television telephone system using a personal computer, there is no way but to decrease the number of screens transmitted for a unit time because of a limit in a band width in an exchanger, which results in increase of a percentage of flickers included in one screen.

Also as gain control for a brightness signal for the n+3-th field is executed according to an integrated value for the n-th signal, there is no relation with a field to be scanned next, so that adjustment for continuous brightness between successive fields can not be achieved. Further, a brightness signal obtained through gain control has been subjected to the feedback processing relating to all the integrated values used in the processor for computing a gain, and when an unexpected noise from outside is mixed in the brightness signal, a brightness signal affected by the noise is successively generated, which is disadvantageous.

Also in the digital type of solid image pick-up device based on the conventional technology, in the method of fixing a time for receiving light once to 1/100 sec to suppress flickers in a fluorescent lamp as described above, there has been the problem that the automatic iris function for obtaining optimal brightness by changing a time for receiving light according to luminous intensity of illumination therearound can not be used. In addition, if a mechanical iris is used, configuration of the device becomes complicated and large, which disadvantageously results in cost increase.

SUMMARY OF THE INVENTION

It is an object of the present invention to provide an image processing apparatus and an image processing method capable of suppressing flickers in a fluorescent lamp and applicable in a digital type as well as an analog type of television cameras, and to a computer-readable recording medium with a program for making a computer execute the method stored therein.

With the present invention, to make a brightness signal generated by flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up unit and a twinkling frequency of illumination are computed by a first unit, and computing using the pixel average value for one field and that for a plurality of fields computed as described above respectively is executed by a second unit to each of image data in the field as a current object for image processing to generate corrected image data, so that it is possible to suppress flickers by taking into account not only flickers included in a field as a current object for image processing but also flickers included in a plurality of fields continuously scanned in the past.

With the present invention, in addition to the actions described above, corrected image data can be generated through simple computing consisting of a step of division and a step of multiplication, so that computing for image processing can be made at a higher speed.

With the present invention, to make a brightness signal generated by flickers included in a field as a current object for image processing not so remarkable, a pixel integrated value for one field in image data in the field and a pixel integrated value for a plurality of fields in present and past image data for the number of fields equivalent to an interference cycle between an image pick-up frequency of the image pick-up unit and a twinkling frequency of illumination are computed by a first unit, and computing using the pixel integrated value for one field and that for a plurality of fields computed as described above respectively is executed by a second unit to each of image data in the field as a current object for image processing to generate corrected image data, so that it is possible to suppress flickers by taking into account not only flickers included in a field as a current object for image processing but also flickers included in a plurality of fields continuously scanned in the past.

With the present invention, in addition to the actions described above, the number of image data required for computing an integrated value can be decreased, which enables image processing at a higher speed.

With the present invention, to make a brightness signal generated due to flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up device and a twinkling frequency of illumination are computed, and corrected image data is generated by executing the computing using the pixel average value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, to make a brightness signal generated due to flickers included in a field as a current object for image processing not so remarkable, a pixel integrated value for one field in image data in the field and a pixel integrated value for a plurality of fields in present and past image data for the number of fields equivalent to an interference cycle between an image pick-up frequency of the image pick-up device and a twinkling frequency of illumination are computed, and corrected image data is generated by executing the computing using the pixel integrated value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, in a computer program for a computer, to make a brightness signal generated due to flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up device and a twinkling frequency of illumination are computed, and corrected image data is generated by executing the computing using the pixel average value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, in a computer program for a computer, to make a brightness signal generated due to flickers included in a field as a current object for image processing not so remarkable, a pixel integrated value for one field in image data in the field and a pixel integrated value for a plurality of fields in present and past image data for the number of fields equivalent to an interference cycle between an image pick-up frequency of the image pick-up device and a twinkling frequency of illumination are computed, and corrected image data is generated by executing the computing using the pixel integrated value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, to make a brightness signal generated due to flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up device and a twinkling frequency of illumination are computed by an integrated value computing unit, and corrected image data is generated by executing the computing using the pixel average value for one field and that for a plurality of fields computed as described above respectively to image data in a field as a current object for image processing with a corrected image data generating unit, so that it is possible to suppress flickers by taking into account not only flickers included in a field as a current object for image processing but also flickers included in a plurality of fields continuously scanned in the past.

Other objects and features of this invention will become understood from the following description with reference to the accompanying drawings.

DESCRIPTION OF THE PREFERRED EMBODIMENTS

Next description is made for embodiments of the image processing apparatus as well as of the image processing method according to the present invention with reference to the related drawings. It should be noted that the present invention is not limited to the embodiments described below.

Figure 1:
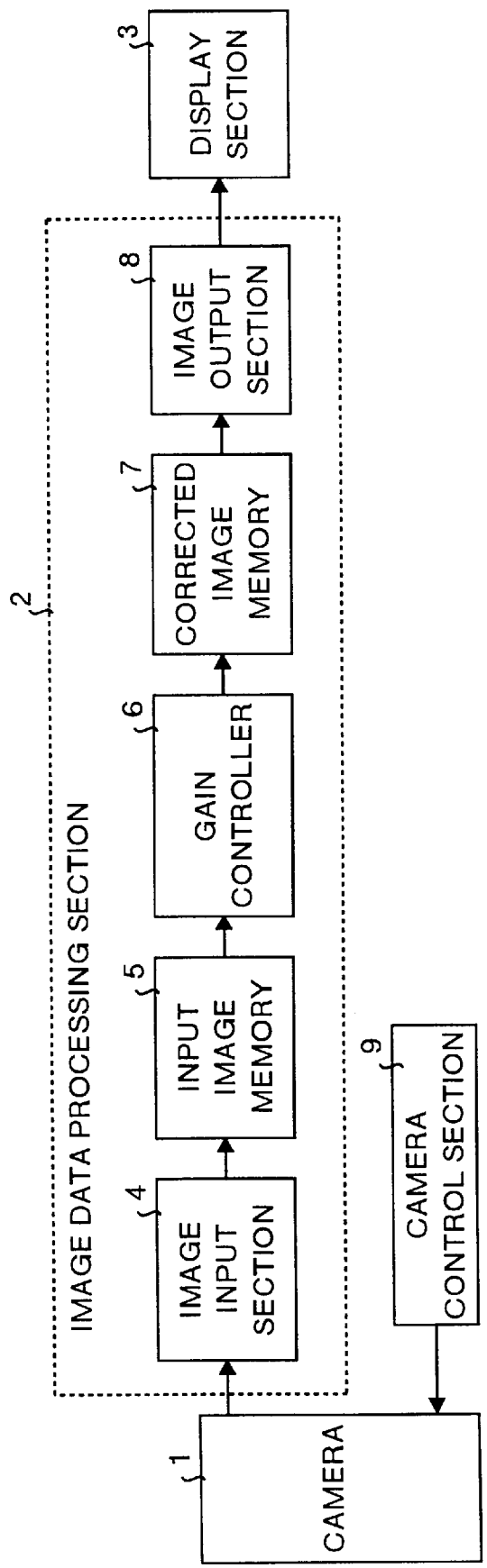
FIG. 1 is a block diagram showing general configuration of an image processing apparatus according to Embodiment 1 of the present invention.

FIG. 1 is a block diagram showing general configuration of the image processing apparatus according to Embodiment 1 of the present invention. In FIG. 1, an image signal indicating an image of an object is generated in a camera 1, and the generated image signal is transmitted as input image data to an image data processing section 2. Herein, the camera 1 may be either an analog type of image pick-up tube or a digital type of solid image pick-up device such as a CCD camera.

When an analog type of image pick-up tube is used as the camera 1, it is necessary to provide, in an image input section 4 of the image data processing section 2, an A/D converter for converting an analog image signal transmitted from the image pick-up tube to a digital image signal, and the digital image signal obtained through the conversion is transmitted as input image-data to an input image memory 5. When a digital type of solid image pick-up device is used as the camera 1, a digital image signal transmitted from the solid image pick-up device is subjected to waveform shaping processing in the image input section 4, and then is transmitted as input image data to the image input memory 5.

The input image memory 5 comprises a RAM or the like, and temporally stores therein transmitted input image data. The input image memory 5 is required to have a capacity sufficient for storing therein at least input image data for one field of a screen, and after it is indicated by a synchronizing circuit of the like not shown herein that storage of the input image data for on field into the input image memory 5 is complete, system control shifts to a gain controller 6.

In the gain controller 6, correction for suppressing fluorescent lamp flickers described later is executed to the input image data stored in the input image memory 5 and corrected image data is generated. The corrected image data generated in the gain controller 6 is stored in a corrected image memory 7. The corrected image data stored in the corrected image memory 7 is transferred to an image output section 8 according to the timing generated by the synchronizing circuit or the like described above. In the image output section 8, the transferred corrected image data is converted to an appropriate signal with a D/A converter or the like and transmitted to a display section 3 such as, for instance, a CRT, and display of an image with fluorescent lamp flickers suppressed is achieved there.

A camera control section 9 mechanically or electrically controls the camera 1 so that the camera 1 can receive a reflected light from the object at various timings, and especially when a digital type of solid image pick-up device is used as the camera 1, the camera control section 9 controls the automatic iris function described above.

Figure 2:
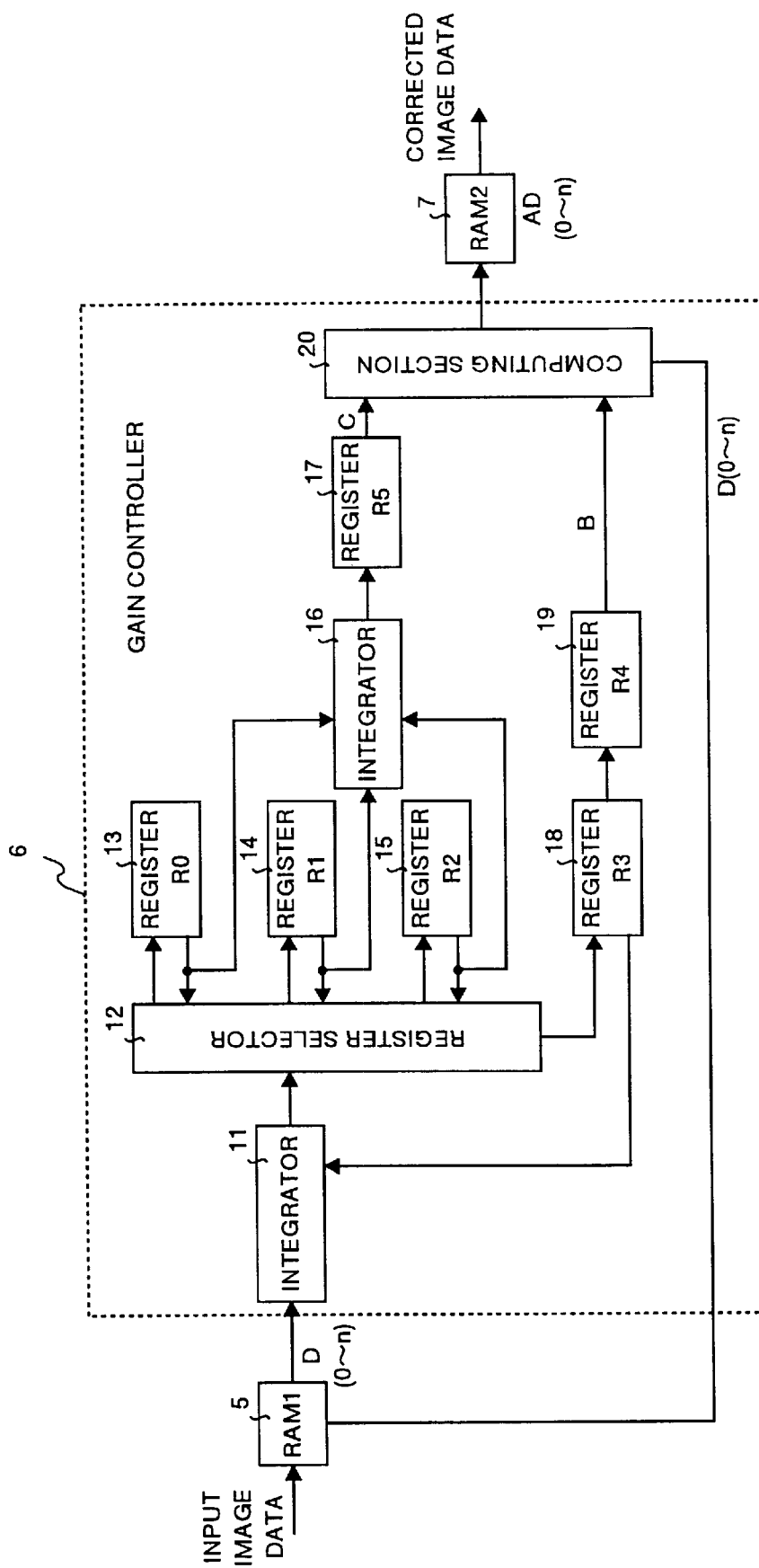
FIG. 2 is a block diagram showing general configuration of the gain controller shown in FIG. 1.

FIG. 2 is a block diagram showing general configuration of the gain controller 6 shown in FIG. 1. In FIG. 2, the input image data D (0 to n) for one field stored in the input image memory 5 (described as RAM 1 hereinafter) is inputted into the gain controller 6. Herein n is a numerical value based on the total number of pixels n+1 included in one field. In the gain controller 6, n+1 pieces of input image data D (0 to n) are processed as a first-dimensional data string, and input image data D (i) (i=0 to n) is successively transmitted to an integrator.

The input image data D (i) transmitted to an integrator 11 is added to a value stored in a register R3 described later, and an integrated signal indicating an added value is transmitted to a register selector 12. In the register selector 12, a register for a field as a current object for processing is selected from three registers of R0 register 13, R1 register 14, and R2 register 15 corresponding to three fields to be scanned continuously, and the integrated signal generated in the integrator 11 is stored in the selected register as well as in the R3 register 18. The integrated signal stored in the R3 register 18 is used as a value to be added in the integrator 11.

In the R3 register 18, when a value obtained through integration of input image data D (0 to n) for one field is stored, the integrated values for one field, namely ΣD (0 to n) are further averaged to obtain a pixel signal for one pixel and the average value is stored in the R4 register 19.

The integrated values stored in the three registers of R0 register 13, R1 register 14, and R2 register 15 are further added in the integrator 16, and a result of addition is further averaged to obtain a pixel signal for one pixel, and the average value is stored in a R5 register 17. The data stored in the R4 register 19 and R5 register 17 respectively is inputted into a computing section 20.

The computing section 20 generates corrected image data AD (0 to n) using the data stored in the R4 register 19 and R5 register respectively and the input image data D (0 to n) stored in the RAM 1.

The generated corrected image data AD (0 to n) is stored in the corrected image memory 7 (described as RAM 2 hereinafter), and with the operations image data with fluorescent lamp flickers suppressed is obtained.

Figure 3:
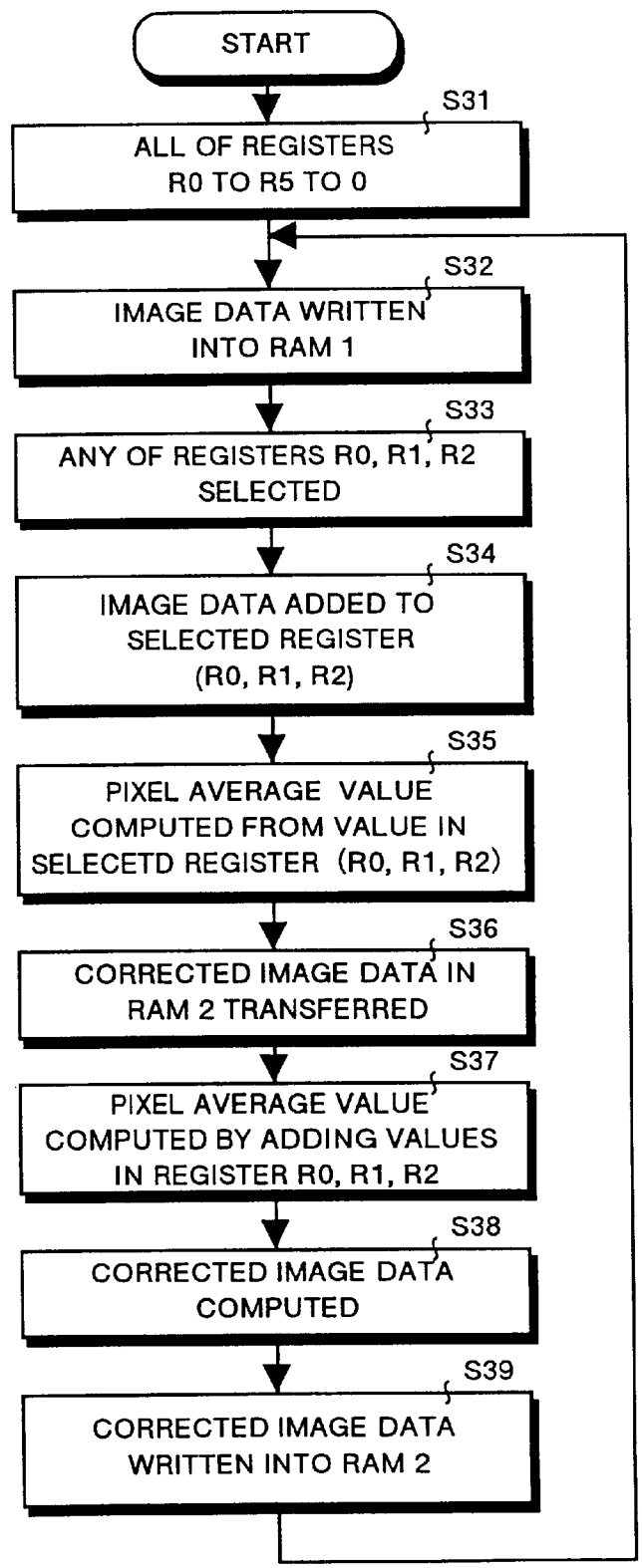
FIG. 3 is a flow chart showing operations of the gain controller shown in FIG. 2.

FIG. 3 is a flow chart showing operations of the gain controller shown in FIG. 2. In FIG. 3, at first 0 (zero) is set in all the registers R0, R1, R2, R3, R4, and R5 to initialization (step S31). Then completion of an operation for writing input image data D (0 to n) into the RAM 1 is waited for (step S32), and when the operation is finished, system control shifts to step S33.

In step S33, any one of the registers R0, R1 and R2 is selected as a register for storing therein input image data for a field as a current object for image processing. Input image data is serially added to the selected register, and an integrated value for the input image data for one field is computed (step S34). The computed integrated value has been stored in the selected register, and a pixel average value B is computed by dividing the integrated value stored in the selected register by the total number of pixels for one filed n+1 (step S35).

Then, the corrected image data already stored in the RAM 2 is transferred to the image output section, where an image based on the corrected image data is displayed on a display unit (step S36). Herein, it becomes possible to store new corrected data in the RAM 2.

After the processing in step S36, integrated values for input image data stored in the three registers of the registers R0, R1, and R2 for three fields to be scanned continuously each including flickers are further added, and a pixel average value C is computed by dividing a result of addition by the total number of pixels for the 3 fields, namely 3 (n+1) (step S37).

After the processing in step S37, the computing of the corrected image data D (0 to n)×C/B is executed using the pixel average values obtained in step S35 and step S37 respectively and the input image data D (0 to n) written in step S32 to obtain the corrected image data AD (0 to n) (step S38). The corrected image data AD (0 to n) computed in step S38 is written in the RAM 2, and then system controls returns to step S32.

By repeating the processing in step S32 to step S39, it is possible to obtain corrected image data based on input image data for two fields scanned in the past.

Figure 4:
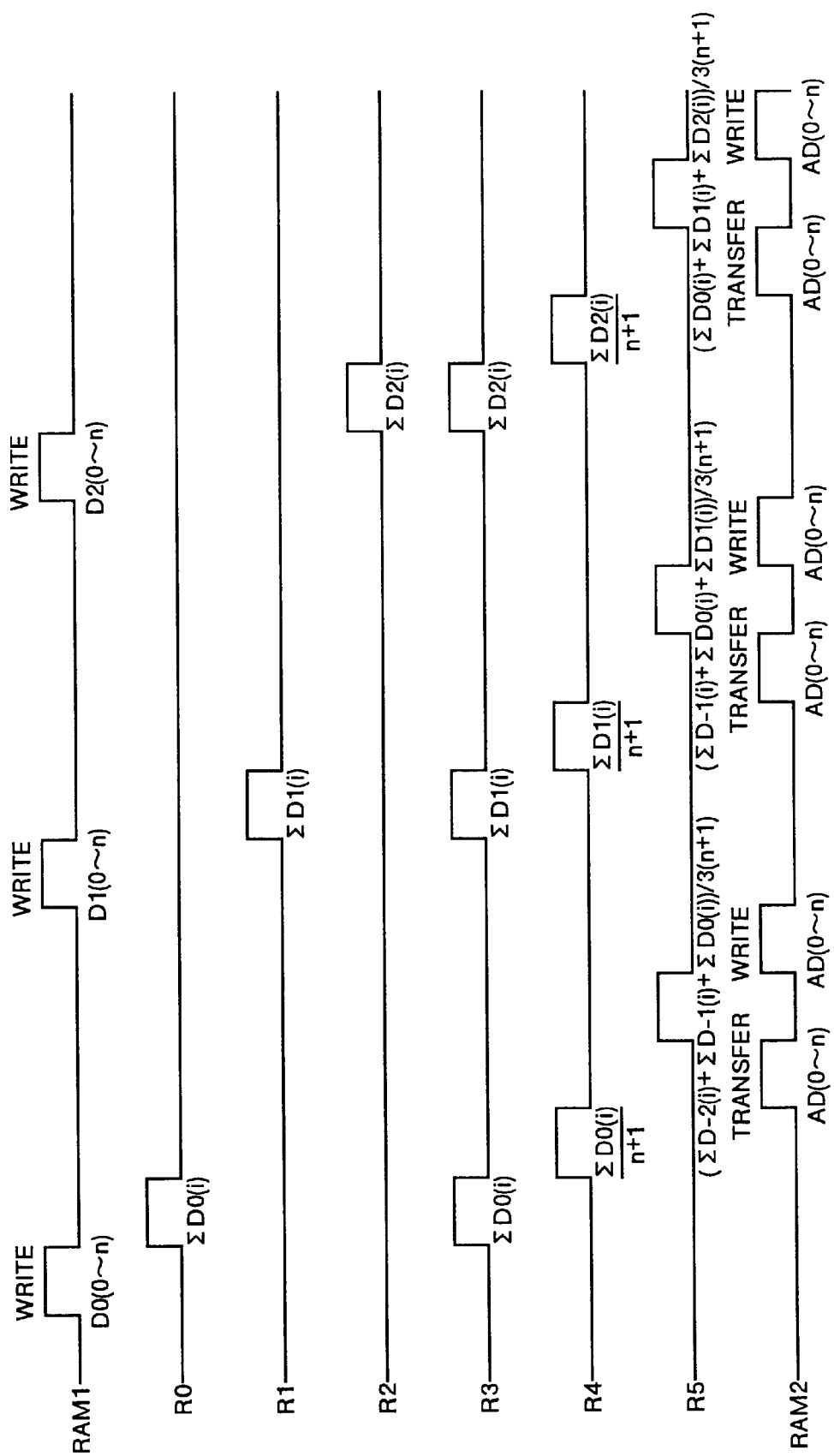
FIG. 4 is a timing chart for three successive fields in the processing as indicted by the flow chart in FIG. 3.

FIG. 4 is a timing chart for three successive fields in the processing as shown in the flow chart in FIG. 3. In FIG. 4, at first input image data D0 (0 to n) for the x-th field is written in the RAM 1. When the input image data D0 (0 to n) has been written, integrated values for input image data D0 (0 to n), namely ΣD0 (i) are computed, and stored in the registers R0 and R3. Herein i=0 to n.

When the integrated values have been stored in the registers R0 and R3, a pixel average value ΣD0 (i)/(n+1) is computed by dividing the integrated value ΣD0 (o to n) for the input image data by the total number of pixels in one field, namely n+1, and the computed pixel average value is stored in the register R4. When the pixel average value (B) is stored in the register R4, the corrected image data AD (0 to n) already stored in the RAM 2 is transferred to the image output section, and then it becomes possible to write new corrected image data in the RAM 2.

When transfer of corrected image data AD (0 to n) in the RAM 2, is complete, a pixel average value (ΣD−2(i)+ΣD−1(i)+ΣD0 (i))/3(n+1) is computed by dividing the integrated value (ΣD−2(i)+ΣD−1(i)+ΣD0 (i)) obtained by further integrating the integrated value already stored in the register R1, namely an integrated value ΣD−2 (i) for input image data for the field two fields ahead from the current one, the integrated value already stored in the register R2, namely an integrated value ΣD−1 (i) for input image data for a field one field ahead from the current one, and the integrated value ΣD D0 stored in the register 0 for input image data for a field as a current object for image processing by the number of pixels for the three fields 3 (n+1), and the computed value is stored in the register R5.

When the pixel average value (C) has been stored in the register R5, D0 (0 to n)×C/B obtained by multiplying the input image data D0 (0 to n) written in the RAM 1 by a value C/B obtained by dividing the pixel average value C stored in the register R5 by. the pixel average value B stored in the register R3 is written as new corrected image data AD (0 to n) in the RAM 2.

When the corrected image data AD (0 to n) has been written in the RAM 2, input image data D1 (0 to n) for the x+1-th field is written in the RAM 1. When the input image data D1 (0 to n) is written, an integrated value for the input image data D1 (0 to n), namely ΣD1 (i) is computed and is stored in the register R1 and register R3.

When the integrated value has been stored in the register R1 and register R3, a pixel average value ΣD1 (i)/(n+1) obtained by dividing the integrated value ΣD1 (i) for the input image data by the number of pixels for one field n+1 is computed, and the computed value is stored in the register R4. When the pixel average value (B) has been stored in the register R4, the corrected image data AD (0 to n) already stored in the RAM 2 is transferred to the image output section, so that it becomes possible to write new corrected image data in the RAM 2.

When transfer of the corrected image data AD (0 to n) is complete in the RAM 2, a pixel average value (ΣD−1(i)+ΣD0(i)+ΣD1(i)/3(n+1) is computed by dividing the integrated value (ΣD−1(i)+ΣD0(i)+ΣD1(i)) obtained by further integrating the integrated value already stored in the register R2, namely an integrated value ΣD−1 (i) for input image data for the field two fields ahead from the current one, the integrated value already stored in the register R0, namely an integrated value ΣD0 (i) for input image data for a field one field ahead from the current one, and the integrated value ΣD1 (i) stored in the register 1 for input image data for a field as a current object for image processing by the number of pixels for the three fields 3 (n+1), and the computed value is stored in the register R5.

When the pixel average value (C) has been stored in the register R5, D1 (0 to n)×C/B obtained by multiplying the input image data D1 (0 to n) written in the RAM 1 by a value C/B obtained by dividing the pixel average value C stored in the register R5 by the average pixel value B stored in the register R3 is written as new corrected image data AD (0 to n) in the RAM 2.

When the corrected image data AD (0 to n) has been written, the input image data D2 (0 to n) for the x+2-th field is written in the. RAM 1. When the input image data D2 (0 to n) has been written in the RAM 1, then an integrated value for the input image data D2 (0 to n), namely ΣD2 (i) is computed and stored in the register R2 as well as in the register R3.

When the integrated value has been stored in the register R2 and register R3, the pixel average value ΣD2 (i)/(n+1) obtained by dividing the integrated value ΣD2 (i) for the input image data by the number of pixels for one field n+1 is computed, and the computed value is stored in the register R4. When the pixel average value (B) has been stored in the register R4, the corrected image data AD (0 to n) already stored in the RAM 2 is transferred to the image output section, so that it becomes possible to write new corrected image data in the RAM 2.

When transfer of the corrected image data AD (0 to n) in the RAM 2 is complete, the pixel average value (ΣD0(i)+ΣD1 (i)+D2 (i))/3(n+1) is computed by dividing the integrated value (ΣD0(i)+ΣD1(i)+ΣD2(i)) obtained by further integrating the integrated value already stored in the register R0, namely an integrated value ΣD0 (i) for input image data for a field 2 fields ahead rom the current one, the integrated value already stored in the register R1, namely an integrated value ΣDI (i) for input image data for a field one field ahead from the current one, and the integrated value ΣD2 (i) for input image data stored in the register R2 as a current object for image processing by the number of pixels for the three fields 3 (n+1), and the computed value is stored in the register R5.

When the pixel average value (C) has been stored in the register R5, the D2 (0 to n)×C/B obtained by multiplying the input image data D2 (0 to n) written in the RAM 1 by the value C/B obtained by dividing the pixel average value C stored in the register R5 by the pixel average value B stored in the register R3 is written as new corrected image data AD (0 to n) in the RAM 2.

With the processing according to the timing described above, to make a brightness signal generated due to flickers included in a field as a current object for image processing not so remarkable, a one-field pixel average value for input image data for the field is computed, and further as input image data for two fields ahead from the current one is always stored in the register, a 3-field pixel average value for input image data for totally the three fields of the past two fields and a current field is computed, and input image data for a field as a current object for image processing is subjected to computing using the one field pixel average value and the 3-field pixel average value computed as described above respectively to generate corrected image data, so that not only flickers included in the field as a current object for image processing, but also those included in several fields successively scanned in the past can be suppressed.

Figure 5:
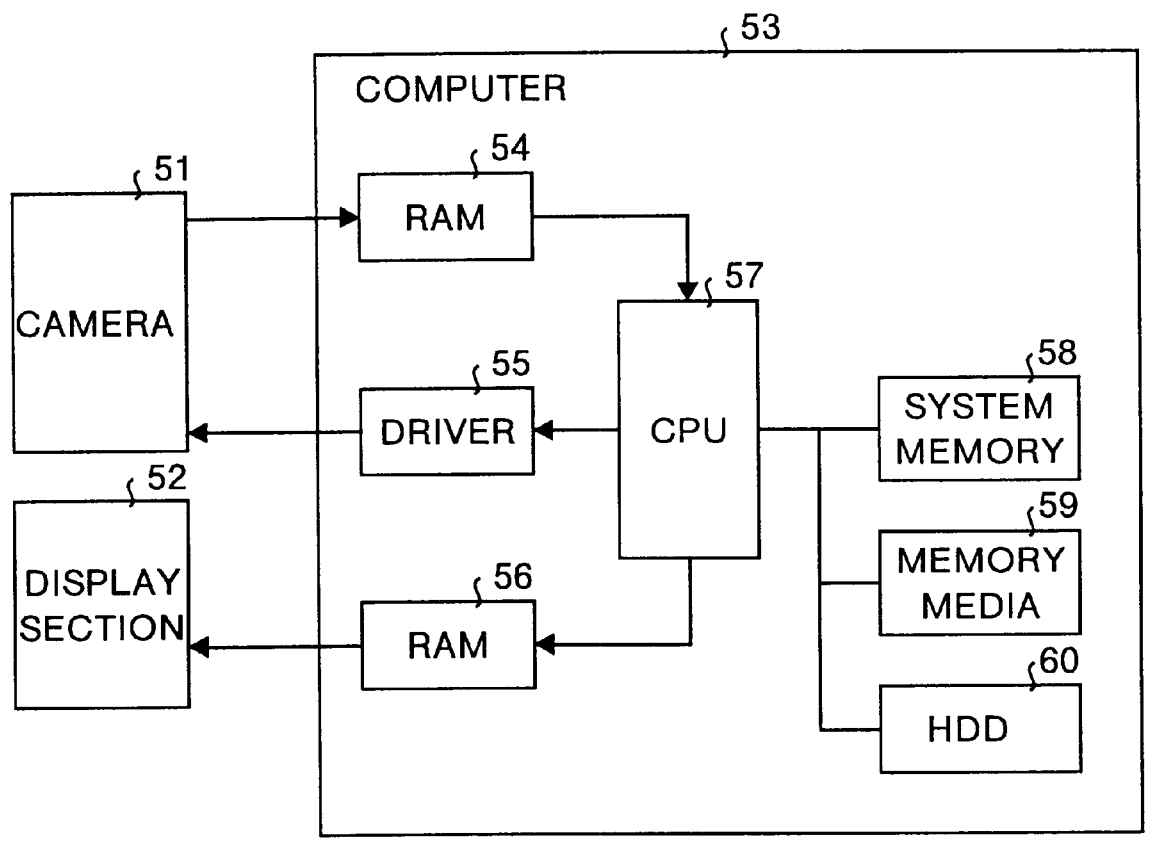
FIG. 5 is a block diagram showing an apparatus in which the image processing method according to Embodiment 2 of the present invention is applied.

FIG. 5 is a block diagram showing the image processing apparatus according to Embodiment 2 of the present invention. In FIG. 5, the processing executed by the image input section 4, image data processing section 2, image output section 8 and camera control section 9 in FIG. 1 is executed in a computer 53, in which the input image memory 5 corresponds to a RAM 54, the corrected image memory 7 to a RAM 56, the cameral control section 9 to a drive 55, and the gain controller 6 to a CPU 57 respectively.

In a case of the image processing apparatus shown in FIG. 5, a digital type of solid image pick-up device such as a CCD camera capable of outputting an image signal as a digital signal is used as the camera 51, but also a case is allowable where an analog type of image pick-up tube is used as the camera 51 and an analog image signal transmitted from the image pickup tube is converted by an A/D converter provided therein to a digital image signal and an image signal based on the digital image, signal is inputted into a computer 53.

Also in the display section 52, an image can be displayed based on digital image data transmitted from the computer 53 by using a D/A converter. The A/D converter or D/A converter may be incorporated in the computer 53.

Further the image processing apparatus according to Embodiment 2 has a system memory 58, a memory media drive 59, and a HDD (hard disc drive) 60. Herein the memory media drive 59 can accommodate therein a memory medium (recording medium) such as a floppy disc or a CD-ROM, and can read out a program stored in the memory media. The CPU 57 reads a program recorded in the memory media into the system memory 58, and executes image processing according to the program. Namely a computer program (described hereinafter) capable of executing the image correction processing, namely the processing in the gain controller 6 in Embodiment 1 is recorded in the memory media. It should be noted that the image correction processing may be executed by installing a program through the memory media in the HDD 60 and reading the installed program into the system memory 58.

Figure 6:
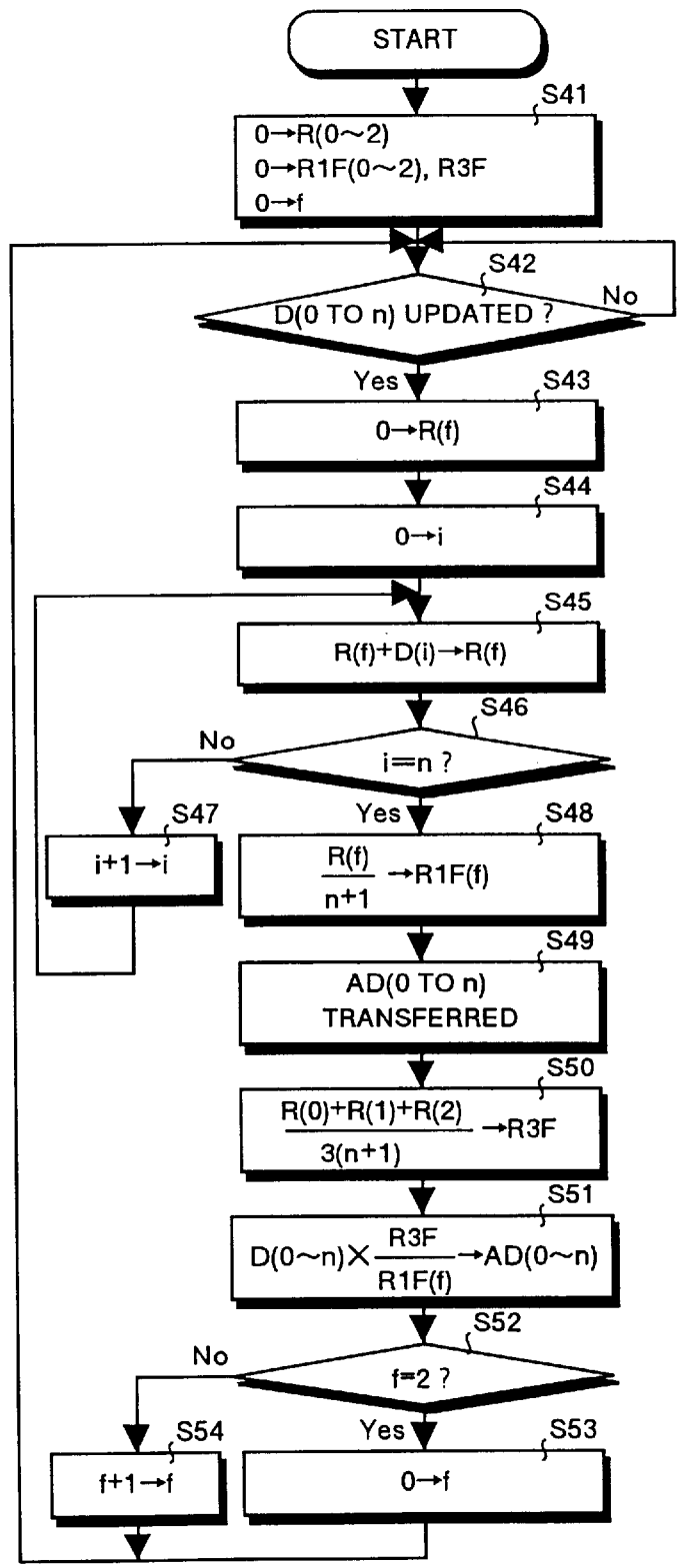
FIG. 6 is a flow chart showing operations of a computer program executed in Embodiment 2.
Figure 7:
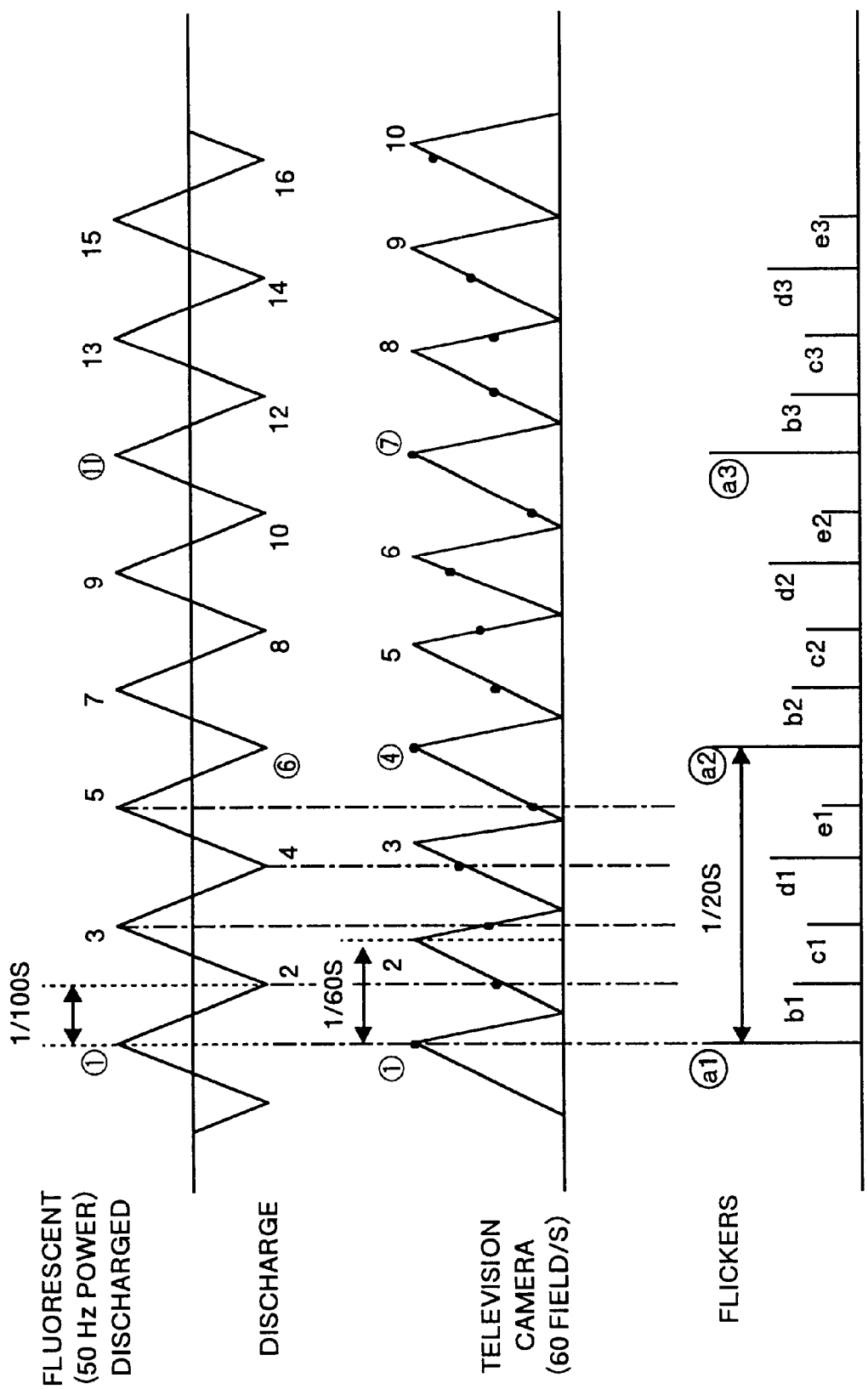
FIG. 7 is a view for illustrating flickers in a fluorescent lamp.
Figure 8:
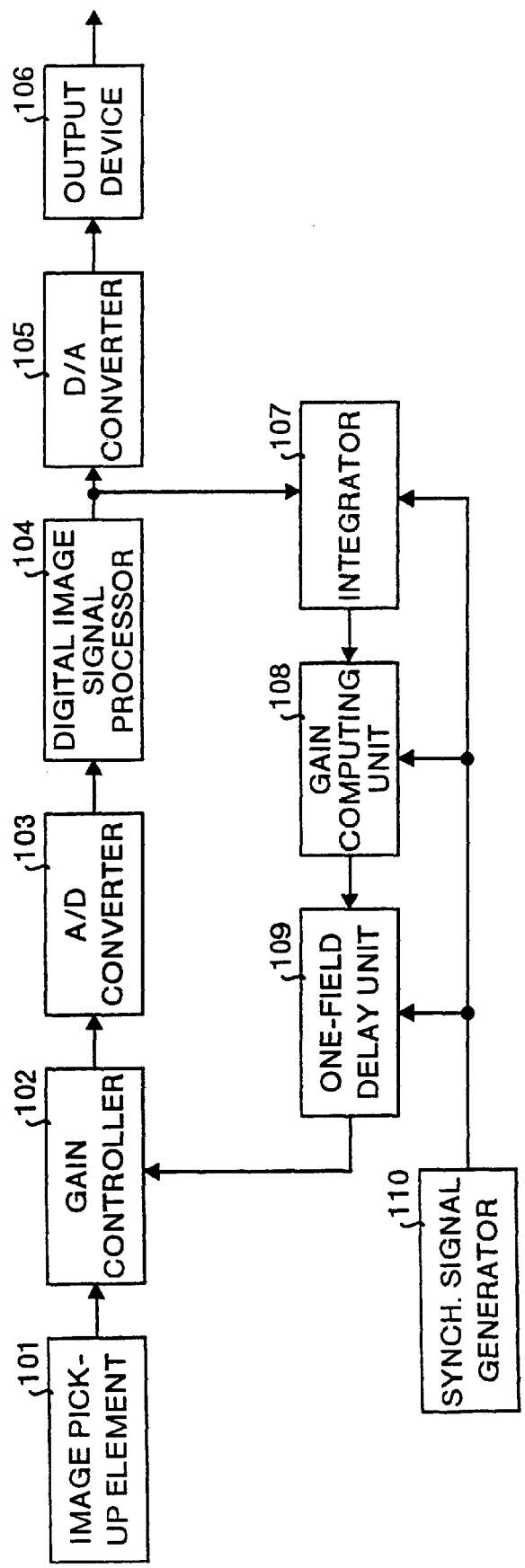
FIG. 8 is a block diagram showing general configuration of an image pick-up device capable of suppressing flickers in a fluorescent lamp based on the conventional technology.
Figure 9:
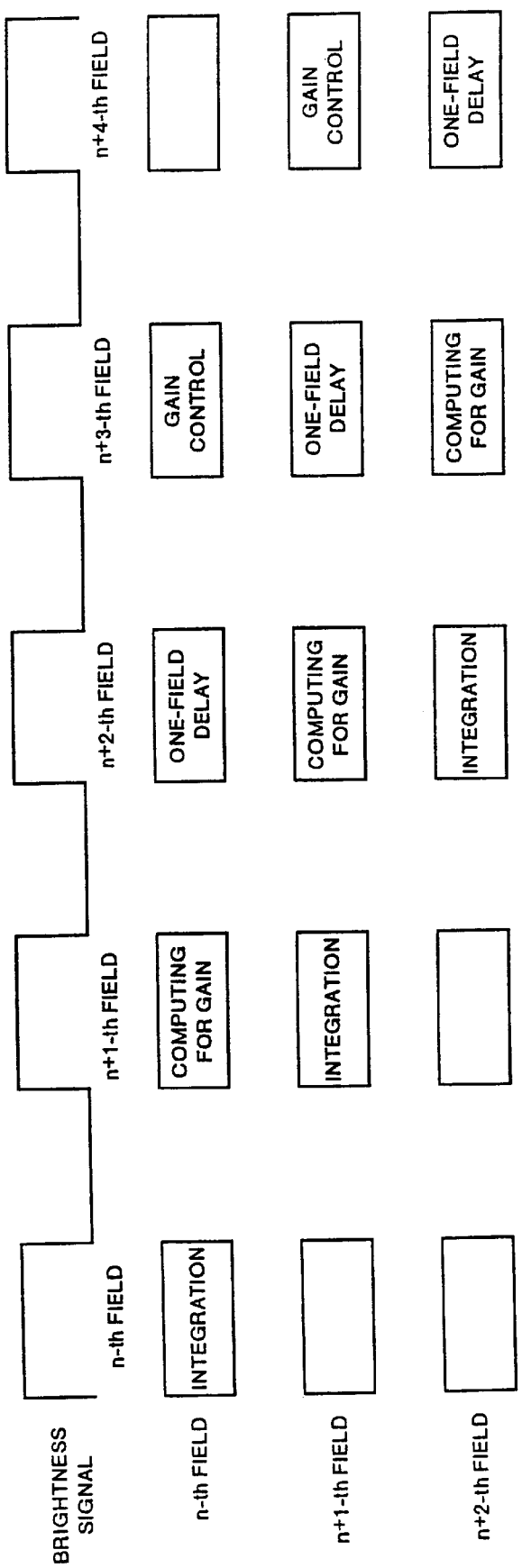
FIG. 9 is a timing chart for an image pick-up device capable of suppressing flickers in a fluorescent lamp based on the conventional technology.

FIG. 6 is a flow chart for operations executed according to a computer program in Embodiment 2. In FIG. 6, at first, 0 (zero) is substituted into three parameters of R (0), R (1), and R (2) for input image data for three fields to be scanned successively. Also 0 (zero) is substituted into the parameters R1F (0), R1F (2), R1F (2) for pixel average values for the three fields to be scanned successively, and further 0 (zero) is substituted into the field parameter f for initialization (step S41).

Then determination is made as to whether input image data string parameters D (0 to n) consisting of n+1 pieces of pixel data for a field as an current object for image processing, namely those stored in the RAM 54 have been updated or not, in other words whether all the input image data for a new field have been fetched or not (step S42).

In step S42, if it is determined that all of the input image data string parameters D (0 to n) have not been updated yet, determination in step S42 is executed again to check whether the input image data parameters D (0 to n) have been updated or not. If it is determined in step S42 that all of the input image data parameters D (0 to n) have been updated, system control shifts to step S43, and 0 (zero) is substituted into the parameter R (f) for input image data for a field as a current object for image processing for initialization. Further in step S44, 0 (zero) is substituted into the parameter i for initialization.

After the processing in step S44, the i-th input image data D (i) is added to the parameter R (f) (step S45). In step S46, determination is made as to whether i is equal to 1 (i=1) or not, namely whether all of the n+1 pieces of pixel data in the input image data string have been added to R (f). If it is determined in step S46 that i is not equal to 1, namely that all of the n+1 pieces of pixel data have not been added to R (f), 1 is added to i (step S47) with system control returning to step S45. When it is determined in step S46 that i is equal to 1, namely that all of n+1 pieces of pixel data in the input image data string have been added to R (f), system control shifts to step S48.

In step S48, the one-field pixel average value R (f)/(n+1) obtained by dividing R (f) by the number of pixels in one field n+1 is substituted into R1F (f). After the pixel average value is substituted into R1F (f) in step S48, data already stored in the corrected image data string parameters AD (0 to n) in the RAM 56 is transferred to the image output section so that the image is displayed on the display section 52.

After the processing for transferring the corrected image data string parameters AD (0 to n) is complete in step S49, a sum of R (0), R (1), and R (2) is obtained, and the three-field pixel average value (R (0)+R(1)+R(2))/3 (n+1) obtained by dividing the sum by the number of pixels for the three fields, namely, 3(n+1) is substituted into R3F (step S50).

After the pixel average value is substituted into R3F in step S50, D (0 to n)×R3F/R1F (f) obtained by multiplying each pixel data stored in the input pixel data parameters D (0 to n) by R3F/R1F (f) obtained by dividing the three-field pixel average value R3F by the one-field pixel average value R1F (f) is substituted as corrected image data strings into AD (0 to n) respectively (step S51). With the processing in step S51, corrected image data with fluorescent lamp flickers suppressed therein is generated.

After the processing in step S51, determination is made as to whether f is equal to 2 or not, namely whether the number of field parameters has reached the number of fields to be processed (f=three: 0, 1, 2) or not (step S52). In step S52, when it is determined that f is equal to 2 (f=2), namely that the field parameter has reached the number of fields to be processed, 0 (zero) is substituted into f (step S53), and system control returns to step S42. When it is determined in step S52 that f is not equal to 2, namely that the field parameter has not reached the number of fields to be processed, 1 is added to f (step S54), and system control returns to step S42.

In the computer program described above, to make a brightness signal generated due to flickers included in a field as a current object for image processing not so remarkable, a one-field pixel average value for input image data in the field is computed, and further as input image data for two fields already processed in the past is always stored in the parameter, so that a three-field pixel average value for input image data for three fields of two fields already processed in the past and a field as a current object for image processing is computed, and corrected image data is generated by executing computing using the one-field pixel average value and three-field pixel average value each computed as described above to input image data for the field as a current object for image processing, so that it is possible to suppress not only flickers included in a field as a current object for image processing but also those in several fields in the fields successively scanned in the past.

Also in the image processing method according to Embodiment 2, corrected image data with fluorescent flickers suppressed therein is generated by a program executable on a computer, so that image correction processing can be executed with low cost configuration using a general-purpose computer.

With the configuration described above, a three-field pixel average value and a one-field pixel average value are computed, and corrected image data is generated by multiplying input image data for a field as a current object for image processing by each of the pixel average values integrated values respectively, but corrected image data may be generated by computing a three-field pixel integrated value and a one-field pixel integrated value and using the integrated values. In this case, corrected image data can be obtained through the expression of (input image data for a field as a current object for image processing)×(3-field pixel integrated value)/(one field pixel integrated value)/3.

Also in the above description, input image data corresponding to all pixel groups in each field is used as image data for computing a one-field pixel average value and a three-field pixel average value, but only input image data corresponding to a portion of pixel groups in each field may be used for that purpose. For instance, only input image data corresponding to pixel groups located at a central section of each field is used.

Also in the above-described embodiment, computing is executed according to input image data for a field as a current object for image processing as well as for two fields successively processed in the past, but the computing may be executed according to input image data for a field as a current object for image processing as well as for two or more fields successively processed in the past. Further, in the above-described embodiments, three fields are used as a cycle for generation of flickers, but the number of fields corresponding to an interference cycle between a image pick-up frequency of an image pick-up unit and a twinkling frequency of illumination, namely the number of field for a cycle of generation of the flickers may be used for the same purpose.

With the embodiments described above, either an analog type of image pick-up tube or a digital type of solid image pick-up device may be used as a camera for receiving an image from an object, and it is possible to suppress fluorescent lamp flickers in any type of camera. Especially, the image processing apparatus and image processing method according to the present invention can be used as an apparatus and a method as a core for a television conference system or a television telephone system which is held indoors with a fluorescent lamp as illumination.

With the present invention, to make a brightness signal generated by flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up unit and a twinkling frequency of illumination are computed by a first unit, and computing using the pixel average value for one field and that for a plurality of fields computed as described above respectively is executed by a second unit to each of image data in the field as a current object for image processing to generate corrected image data, so that it is possible to suppress flickers by taking into account not only flickers included in a field as a current object for image processing but also flickers included in a plurality of fields continuously scanned in the past.

With the present invention, in addition to the actions described above, corrected image data can be generated through simple computing consisting of a step of division and a step of multiplication, so that computing for image processing can be made at a higher speed.

With the present invention, to make a brightness signal generated by flickers included in a field as a current object for image processing not so remarkable, a pixel integrated value for one field in image data in the field and a pixel integrated value for a plurality of fields in present and past image data for the number of fields equivalent to an interference cycle between an image pick-up frequency of the image pick-up unit and a twinkling frequency of illumination are computed by a first unit, and computing using the pixel integrated value for one field and that for a plurality of fields computed as described above respectively is executed by a second unit to each of image data in the field as a current object for image processing to generate corrected image data, so that it is possible to suppress flickers by taking into account not only flickers included in a field as a current object for image processing but also flickers included in a plurality of fields continuously scanned in the past.

With the present invention, in addition to the actions described above, the number of image data required for computing an integrated value can be decreased, which enables image processing at a higher speed.

With the present invention, to make a brightness signal generated due to flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up device and a twinkling frequency of illumination are computed, and corrected image data is generated by executing the computing using the pixel average value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, to make a brightness signal generated due to flickers included in a field as a current object for image processing not so remarkable, a pixel integrated value for one field in image data in the field and a pixel integrated value for a plurality of fields in present and past image data for the number of fields equivalent to an interference cycle between an image pick-up frequency of the image pick-up device and a twinkling frequency of illumination are computed, and corrected image data is generated by executing the computing using the pixel integrated value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, in a computer program for a computer, to make a brightness signal generated due to flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up device and a twinkling frequency of illumination are computed, and corrected image data is generated by executing the computing using the pixel average value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, in a computer program for a computer, to make a brightness signal generated due to flickers included in a field as a current object for image processing not so remarkable, a pixel integrated value for one field in image data in the field and a pixel integrated value for a plurality of fields in present and past image data for the number of fields equivalent to an interference cycle between an image pick-up frequency of the image pick-up device and a twinkling frequency of illumination are computed, and corrected image data is generated by executing the computing using the pixel integrated value for one field and that for a plurality of fields computed as described above respectively to image data in a field as a current object for image processing, so that it is possible to suppress flickers by taking into account not only flickers included in a field as a current object for image processing but also flickers included in a plurality of fields continuously scanned in the past.

With the present invention, to make a brightness signal generated due to flickers included in a field as a current object for image processing not so remarkable, a pixel average value for one field in image data in the field and a pixel average value for a plurality of fields in present and past image data for the number of fields equivalent to an interference cycle between an image pick-up frequency of the image pick-up device and a twinkling frequency of illumination are computed by an integrated value computing unit, and corrected image data is generated by executing the computing using the pixel average value for one field and that for a plurality of fields computed as described above respectively to image data in a field as a current object for image processing with a corrected image data generating unit, so that it is possible to suppress flickers by taking into account not only flickers included in a field as a current object for image processing but also flickers included in a plurality of fields continuously scanned in the past.

This application is based on Japanese patent application No. HEI 10-166935 filed in the Japanese Patent Office on Jun. 15, 1998, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing apparatus capable of suppressing flickers included in image data outputted from an image pick-up unit for picking up an image of an object, comprising:

a first unit computing a first value corresponding to an average value of image data in a current field and a second value corresponding to an average value of image data for the number of fields equivalent to an interference cycle between an image pick-up frequency of the image pick-up unit and a flickering frequency of illumination, the image data for the number of fields equivalent to the interference cycle including the image data in the current field; and a second unit generating corrected image data in the current field based on the first value and the second value.

2. An image processing apparatus according to claim 1, wherein the first value is an integrated value obtained by integrating the image data in the current field and the second value is an integrated value obtained by integrating the image data for the number of fields equivalent to the interference cycle between the image pick-up frequency of the image pick-up unit and a flickering frequency of illumination.

3. An image processing apparatus according to claim 2, wherein, when computing the first and second values, the integrated values are computed by using image data in a portion of a central section of a stored field.

4. An image processing apparatus according to claim 1, wherein said second unit multiplies the image data in the current field by a value obtained by dividing the second value by the first value.

5. An image processing apparatus according to claim 4, wherein the first value is an integrated value obtained by integrating the image data in a current field and the second value is an integrated value obtained by integrating the image data for the number of fields equivalent to an interference cycle between an image pick-up frequency of the image pick-up unit and the flickering frequency of illumination.

6. An image processing apparatus according to claim 5, wherein, when computing the first and second values, the integrated values are computed by using image data in a portion of a central section of a stored filed.

7. An image processing method for suppressing flickers included in image data outputted from an image pick-up unit for picking up an image of an object, comprising:

computing a first value corresponding to an average value in a current field and a second value corresponding to an average value for the number of fields equivalent to an interference cycle between an image pick-up frequency of the image pick-up unit and a flickering frequency of illumination, the image data for the number of fields equivalent to the interference cycle including the image data in the current field;

generating corrected image data in the current field based on the first and second values.

8. An image processing method according to claim 7, wherein the first value is an integrated value obtained by integrating the image data in a current field and the second value is an integrated value obtained by integrating the image data for the number of fields equivalent to an interference cycle between an image pick-up frequency of the image pickup unit and a flickering frequency of illumination.

9. An image processing method according to claim 8, wherein, when computing the first and second values, the integrated values are computed by using image data for a portion of a central section of a stored field.

10. An image processing method according to claim 7, wherein, in said generating, the image data in a current field is multiplied by a value obtained by dividing the second value by the first value.

11. An image processing method according to claim 10, wherein the first value is an integrated value obtained by integrating the image data in a current field and the second value is an integrated value obtained by integrating the image data for the number of fields equivalent to an interference cycle between the image pick-up frequency of the pick-up unit and the flickering frequency of illumination.

12. An image processing method according to claim 11, wherein, when computing the first and second values, the integrated values are computed by using image data for a portion of a central section of a stored field.

13. A computer-readable recording medium with a program for making a computer execute an image processing method of suppressing flicker included in image data outputted from an image pick-up unit for picking up an image of an object stored therein, said method comprising:

computing a first value corresponding to an average value of image data in a current field and a second value corresponding to an average value of image data for the number of fields equivalent to an interference cycle between an image pick-up frequency of the image pickup unit and a flickering frequency of illumination, the image data for the number of fields equivalent to the interference cycle including the image data in the current field;

generating corrected image data in the current field based on the first and second values.

14. A computer-readable recording medium according to claim 13, wherein the first value is an integrated value obtained by integrating the image data in a current field and the second value is an integrated value obtained by integrating image data for the number of fields equivalent to an interference cycle between the image pick-up frequency in the image pick-up unit and the flickering frequency of illumination.

15. A computer-readable recording medium according to claim 14, wherein, when computing the first and second values, the integrated values are computed by using image data in a portion of a central section of a stored field.

16. A computer-readable recording medium according to claim 13, wherein, in said generating, image data in a current field is multiplied by a value obtained by dividing the second value by the first value.

17. A computer-readable recording medium according to claim 16, wherein the first value is an integrated value obtained by integrating image data in a current field, and the second value is an integrated value obtained by integrating image data for the number of fields equivalent to an interference cycle between the image pick-up frequency in the image pick-up unit and the flickering frequency of illumination.

18. A computer-readable recording medium according to claim 17, wherein, when computing the first and second integrated values, the integrated values are computed by using image data in a portion of a central section of a stored field.

19. An image processing apparatus for suppressing flickers included in image data outputted from an image pick-up unit for picking up an image of an object, comprising:

an integrated value computing unit computing a first integrated value by integrating image data in a current field and also computing a second integrated value by integrating image data for the number of fields equivalent to an interference cycle between an image pick-up frequency in the image pick-up unit and a flickering frequency of illumination, the image data for the number of fields equivalent to the interference cycle including the image data in the current field; and a corrected image data generating unit generating corrected image data for the current field based on the first and second integrated values.

20. An image processing method of suppressing flicker included in image data outputted from an image pick-up unit for picking up an image of an object, comprising:

computing a first integrated value by integrating image data in a current field and also computing a second integrated value by integrating image data for the number of fields equivalent to an interference cycle between an image pick-up frequency in the image pick-up unit and a flickering frequency of illumination, the image data for the number of fields equivalent to the interference cycle including the image data in the current field; and generating corrected image data for the current field based on the first and second integrated values.

21. A computer-readable-recording medium with a program for making a computer execute an image processing method of suppressing flickers included in image data outputted from an image pick-up unit for picking up an image of an object stored therein, said method comprising:

computing a first integrated value by integrating image data in a current field and also computing a second integrated value by integrating image data for the number of fields equivalent to an interference cycle between an image pick-up frequency in the image pick-up unit and a flickering frequency of illumination, the image data for the number of fields equivalent to the interference cycle includes the image data in the current field; and generating corrected image data for the current field based on the first and second integrated values.

22. An image processing method for suppressing flicker included in image data, comprising:

determining a first value corresponding to an average value of image data in a current field and a second value corresponding to an average value of image data for a plurality of fields including the current field; and generating corrected image data in the current field based on the first and second values.

23. An image processing method according to claim 22, wherein the number of fields in the plurality of fields is equivalent to an interference cycle between an image pickup frequency of an image pick up unit which outputs the image data and a flickering frequency of illumination.

24. An image processing method according to claim 22, wherein the first value is an integrated value obtained by integrating the image data in a current field, and the second value is an integrated value obtained by integrating the image data for the plurality of fields including the current field.

* * * * *